Oct. 11, 1932.  W. C. LAUGHLIN  1,881,712
AUTOMATIC CLEANING DEVICE FOR CLARIFIERS
Filed March 20, 1930   5 Sheets-Sheet 1

Inventor
William C. Laughlin
By Attorney
Albert M. Austin

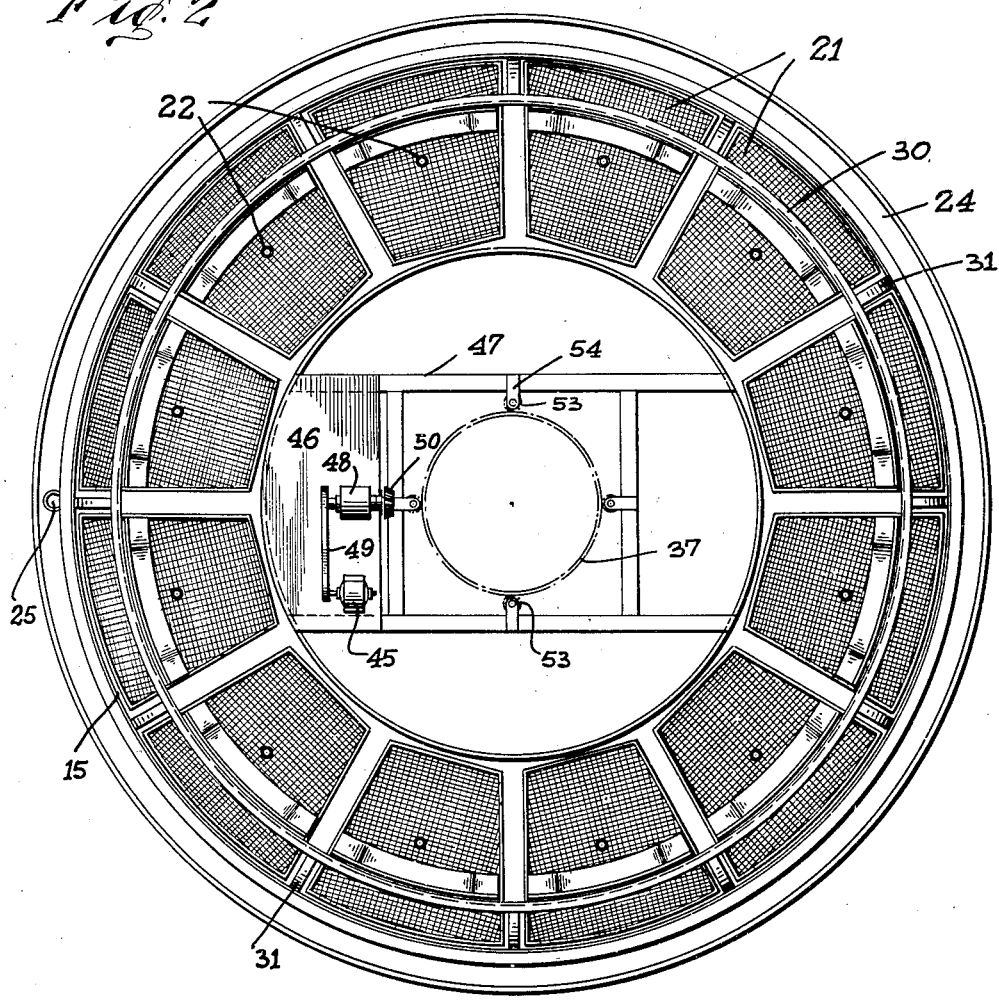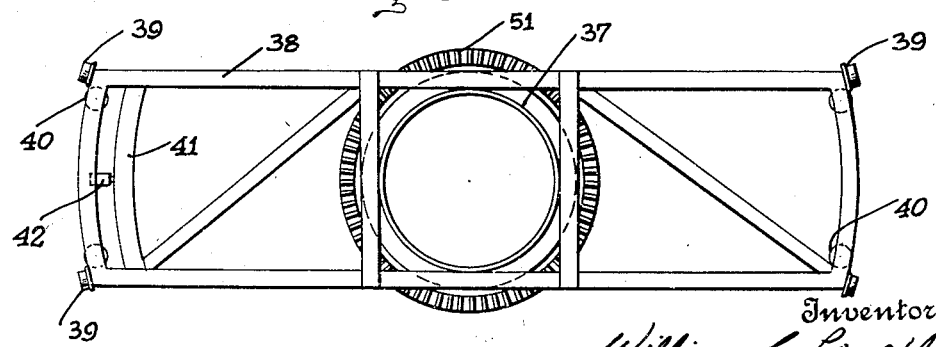

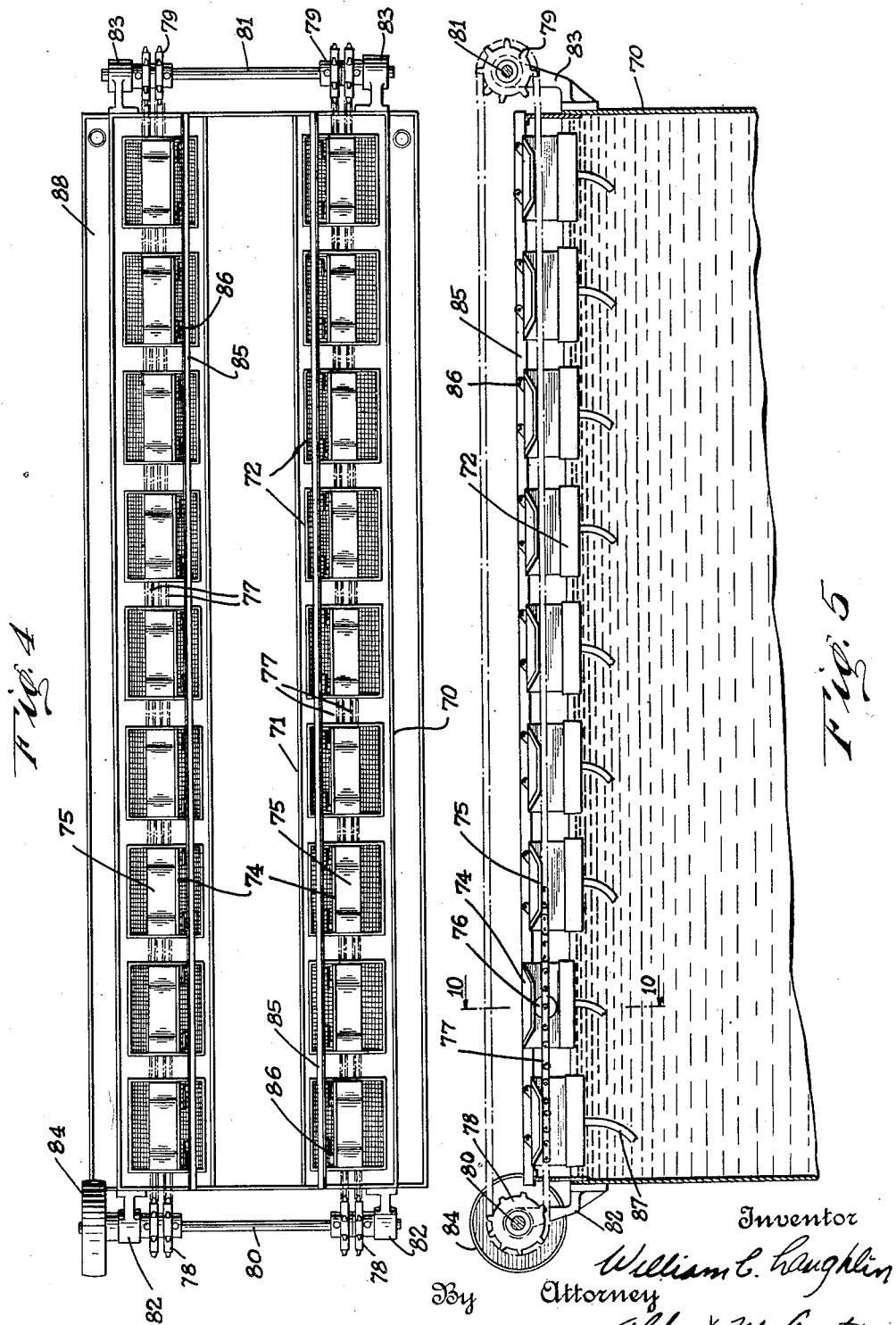

Oct. 11, 1932.　　　W. C. LAUGHLIN　　　1,881,712
AUTOMATIC CLEANING DEVICE FOR CLARIFIERS
Filed March 20, 1930　　5 Sheets-Sheet 4
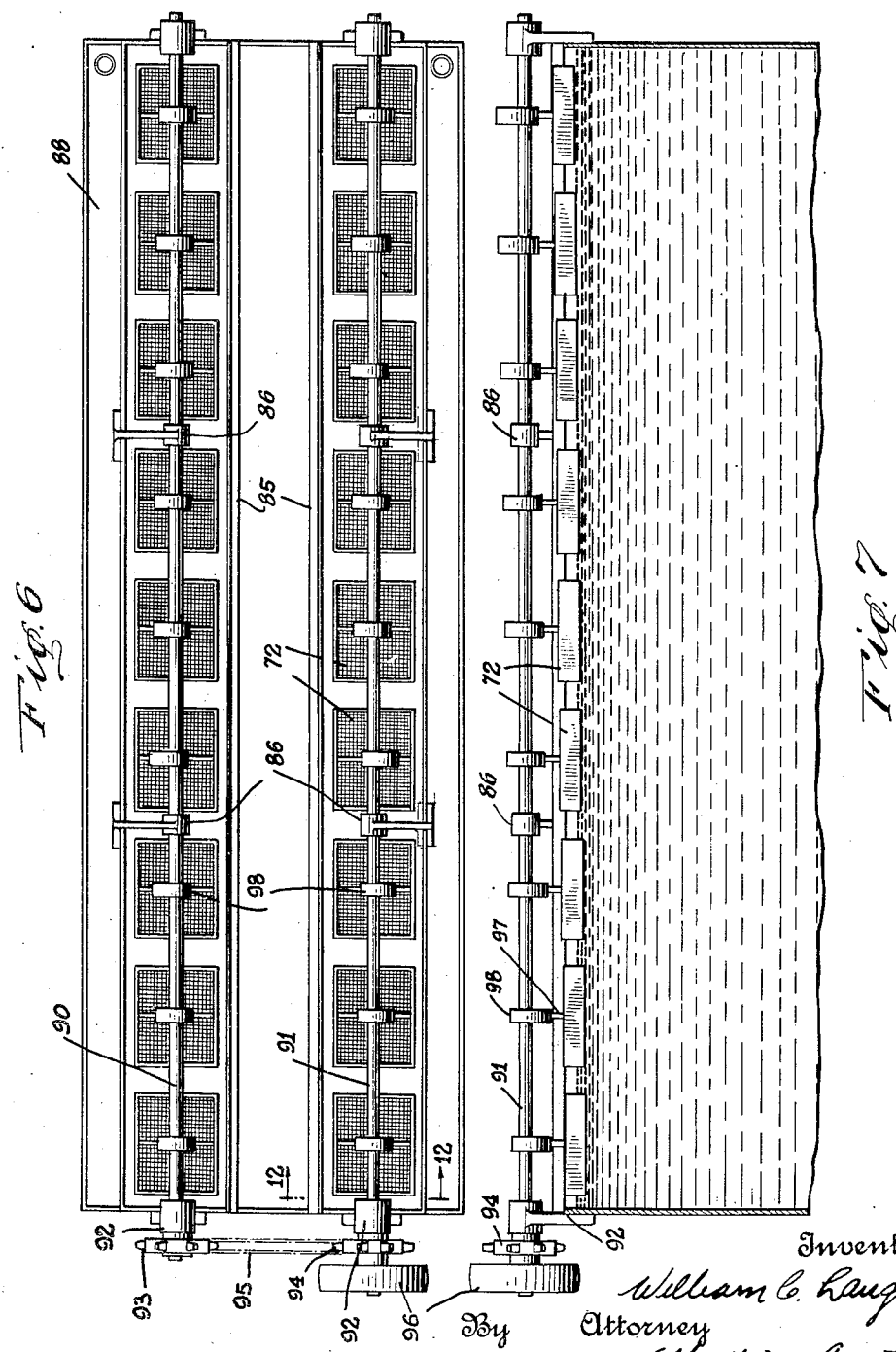

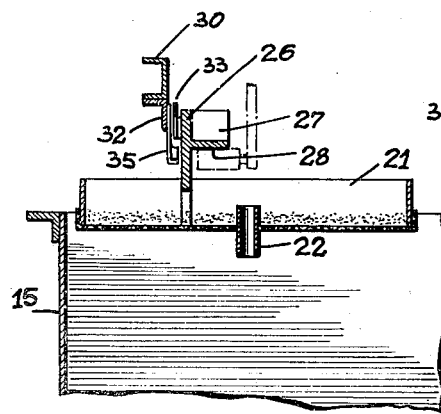
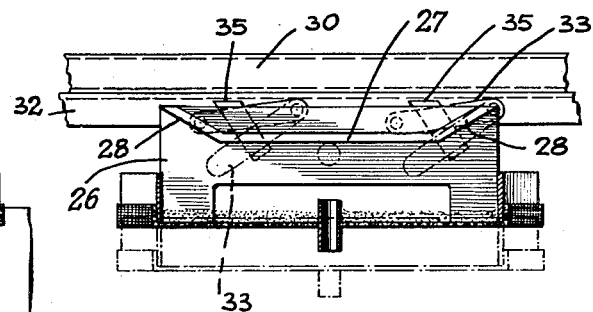
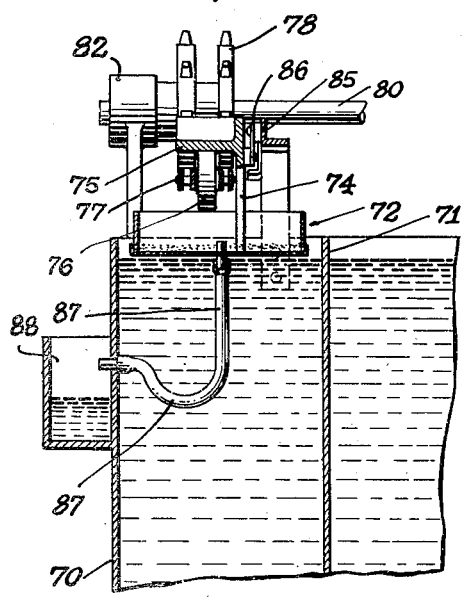
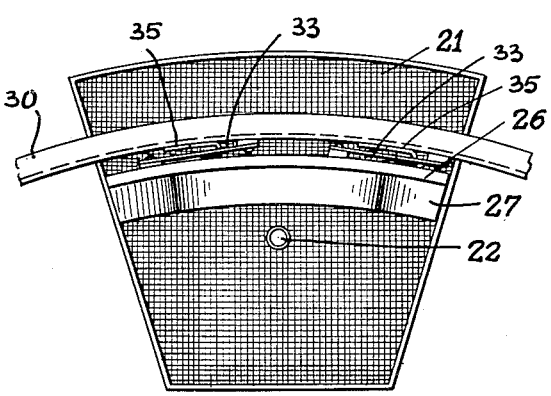
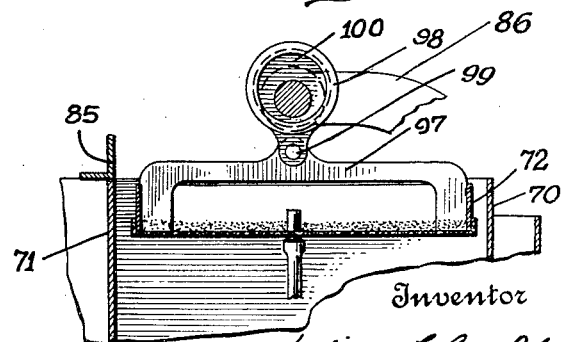

Patented Oct. 11, 1932

1,881,712

UNITED STATES PATENT OFFICE

WILLIAM C. LAUGHLIN, OF GLENDALE, CALIFORNIA, ASSIGNOR TO THE L. A. B. COMPANY, OF NEW YORK, N. Y., A CORPORATION OF NEW YORK

AUTOMATIC CLEANING DEVICE FOR CLARIFIERS

Application filed March 20, 1930. Serial No. 437,320.

This invention relates to clarifier apparatus and more particularly to an automatic mechanism for periodically cleaning the clarifier medium.

The invention is particularly applicable to a clarifier tank of the type having a plurality of removable baskets containing the clarifier medium, such as that disclosed more in detail in my co-pending application Serial Number 368,836 filed June 6, 1929 for clarifier, and provides mechanism for periodically raising the baskets out of contact with the liquid under treatment for cleaning purposes. In a preferred form of the apparatus, the liquid is passed upwardly through the baskets containing the clarifier medium and is subsequently discharged into an overflow weir. The baskets are periodically raised to permit the liquid to drain downwardly through the medium contained therein and thereby remove foreign particles and cleanse the medium. This is accomplished entirely automatically, whereby the apparatus may be used for an indefinite period without manual attention.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a transverse sectional view of a clarifier tank constructed in accordance with the present invention;

Fig. 2 is a top plan view thereof with the rotating carriage removed;

Fig. 3 is a top plan view of the rotating carriage;

Fig. 4 is a top plan view of a modified form of clarifier tank showing the automatic cleaning mechanism applied thereto;

Fig. 5 is a longitudinal sectional view of the tank shown in Fig. 4;

Fig. 6 is a top plan view of a clarifier tank showing a modified form of cleaning mechanism;

Fig. 7 is a longitudinal section thereof;

Fig. 8 is an enlarged detail view of a clarifier basket and support;

Fig. 9 is a side elevation thereof;

Fig. 10 is a section taken on line 10—10 of Fig. 5;

Fig. 11 is a plan view of a basket shown in Fig. 2 showing the support; and

Fig. 12 is a sectional view taken on line 12—12 of Fig. 6.

Like reference characters denote like parts in the several figures of the drawings.

Figure 1:
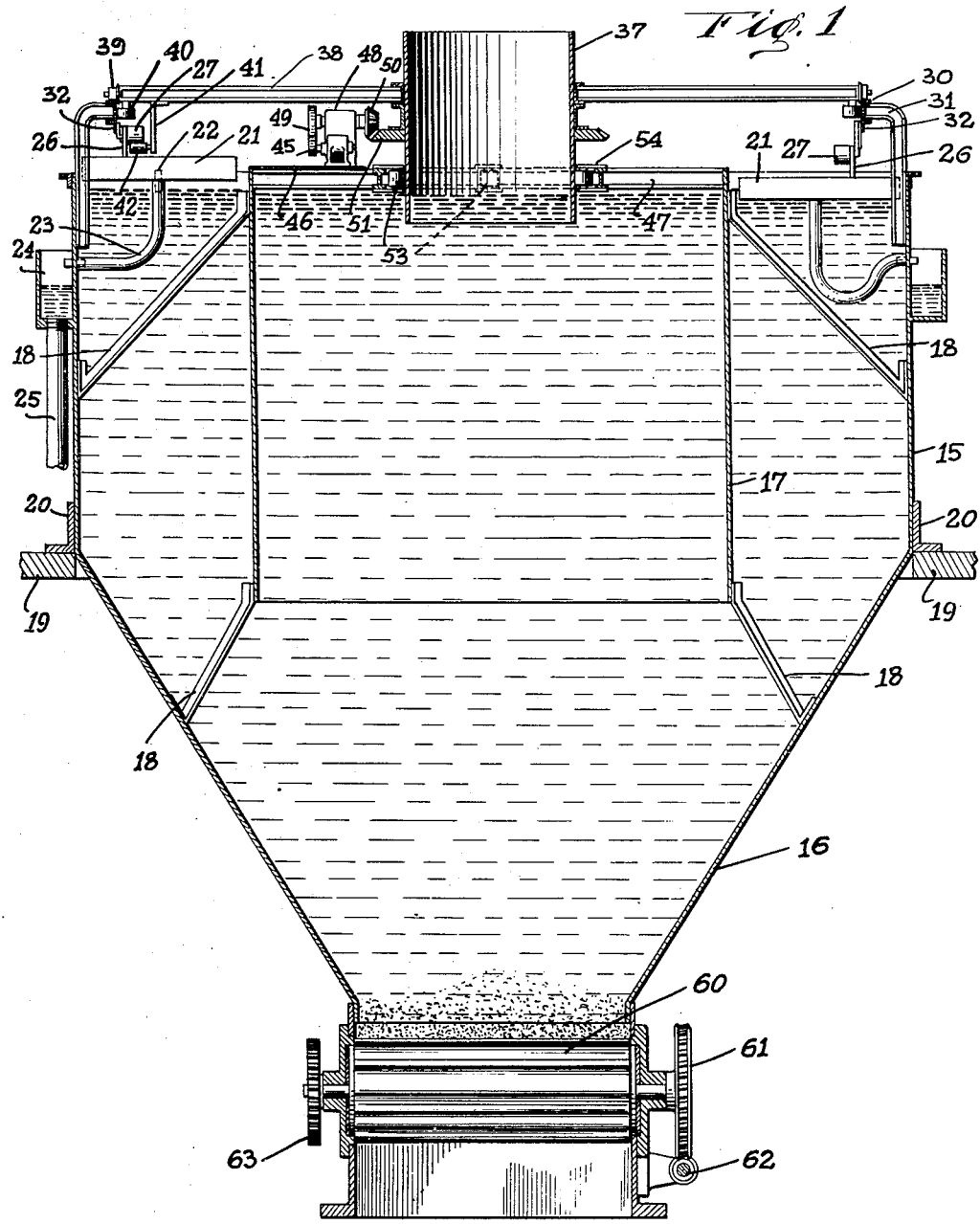

In the following description and in the claims parts will be identified by specific names for convenience, but they are intended to be as generic in their application to similar parts as the art will permit.

Referring more particularly to the drawings, one form of the invention is shown in Figs. 1 to 3 as applied to a clarifier tank having a substantially cylindrical wall 15 and a hopper 16. A cylindrical baffle 17 is mounted within wall 15 by supports 18 which extend between said baffle and said wall. The tank may be supported from any suitable base member 19, as by angles 20, which are secured to wall 15 and rest on said base member.

A plurality of clarifier baskets 21 are mounted in the top of said tank between baffle 17 and wall 15. Said baskets are provided with perforated bottoms and contain a clarifier medium suited to the liquid under treatment. A discharge pipe 22 is mounted centrally of each basket and extends above the clarifier medium therein. Said pipe is connected by a flexible hose 23 to a weir 24, which is located externally of wall 15. Discharge pipe 25 is associated with said weir and provides for the discharge of the clear liquid after treatment by the clarifier.

Each basket 21 has secured thereto an upstanding member 26 provided with a horizontal flange 27 (Figs. 8, 9 and 11) which is bent upwardly at its ends to form cam surfaces 28.

Circular track 30 is mounted above the clarifier tank and is supported by suitable brackets 31 which are secured to the walls of said tank at convenient intervals. Secured to track 30 is a downwardly extending flange 32 to which links 33 are pivoted. Said links extend substantially parallel and are pivoted to member 26 in such a manner that basket 21 always remains horizontal regardless of any vertical movement which is imparted thereto. Stop members 35 are secured to flange 32 and co-operate with links 33 for determining the lower-most position of baskets 21.

A feed pipe 37 is supported by carriage 38 which extends across the clarifier tank and is provided with wheels 39 which rest on track 30. Said carriage is also provided with wheels 40 which are mounted for rotation about a vertical axis and rest against the inner face of track 30 for preventing displacement of the carriage. A downwardly extending flange member 41 is mounted on the carriage and carries a roller 42 which is positioned to contact with cam surfaces 28 of flanges 27 as the carriage is rotated for raising the various baskets out of contact with the liquid in the tank. A driving motor 45 is mounted on a platform 46 which is carried by truss members 47 extending across the top of the clarifier tank and secured to baffle 17. Said motor is connected to a reducing gear 48 by belt 49 and drives a beveled gear 50, which is in mesh with a beveled gear 51, carried by feed pipe 37. A plurality of rollers 53 are secured to truss 47 by straps 54 and contact with the outer surface of feed pipe 37 for maintaining the same in proper alignment with the tank.

A discharge mechanism, which may be of a form more fully described in my co-pending application Serial Number 413,794 filed December 13, 1929 for discharge apparatus, is mounted beneath hopper 16. Said apparatus comprises a plurality of rollers 60 having fluted surfaces which are maintained in contact for preventing a discharge of liquid therebetween. Said rollers are driven by gear 61 in mesh with worm gear 62 and are provided with spur gears 63 which cause the adjacent rollers to be operated at the same speed and in opposite directions. The operation is such that rotation of the rollers causes the sludge to be discharged around the surface thereof, but prevents passage of material between adjacent rollers. It is apparent that any type of discharge apparatus may be employed. A particular type has been described by way of illustration only.

In the operation of the above described clarifier, liquid is applied through feed pipe 37 and flows downwardly around baffle 17, thence upwardly between said baffle and wall 15 and passes through the clarifier medium in baskets 21, after which it is discharged through hose 23 into weir 24. As the operation is continued, the clarifier medium may become contaminated with undesired material and must be removed at intervals for cleaning purposes. This is accomplished by causing the carriage 38 to rotate slowly in response to operation of motor 45, for example at a speed of one revolution in ten minutes. As roller 42 contacts with cam surface 28 of flanges 27 the clarifier baskets 21 are elevated out of contact with the liquid, the links 33 causing the basket to remain in horizontal position. The liquid which is contained in the basket then flows downwardly through the clarifier medium and washes out the undesired particles. If desired, the medium may be further washed by applying a suitable spray thereto. The wash liquid passes through the medium and is mixed with the liquid in the clarifier, but does not enter the overflow weir inasmuch as liquid can only be applied to said weir through hose 23.

The invention is shown in Figs. 4 and 5 as applied to a rectangular clarifier tank comprising side walls 70 and baffles 71. A plurality of clarifier baskets 72 are mounted in said tank between the side walls and the baffle and are provided with upstanding members 74, similar to members 26, which were described in connection with baskets 21 of Figs. 1 to 3. A horizontal flange 75 is mounted on member 74 and is provided at its ends with beveled surfaces to engage roller 76 which is carried between chains 77. Said chains are passed around sprockets 78 and 79 which are mounted on rods 80 and 81 respectively, located at opposite ends of the tank. Said rods are supported in any convenient manner as by brackets 82 and 83 respectively. Driving force may be applied to shaft 80 by belt pulley 84 from any suitable source of power.

Baskets 72 are hung from rails 85 by links 86 which are connected in a manner similar to links 33 above described. Liquid is discharged from baskets 72 through hose 87 into weir 88.

In the operation of this form of the invention the liquid is applied to the tank between baffles 71 and rises upwardly between baffles 71 and wall 70, through baskets 72 and the clarifier medium contained therein. The baskets are selectively raised due to roller 76 co-operating with flange 75 as sprockets 78 and 79 are rotated. It is to be noted that the roller co-operates with only one basket at any given time and raises that basket out of contact with the liquid in the tank, whereby the clarifier medium therein is cleaned in the manner pointed out in connection with Figs. 1 to 3.

It is obvious that the speed of chains 77 and of the drive sprockets may be varied to suit the particular requirements and that more than one roller can be employed, if desired. A particular form is described by way of illustration only.

Referring to the modification shown in Figs. 6 and 7 the parts corresponding to those shown in Figs. 4 and 5 are given similar reference numbers. The cleaning apparatus in this modification comprises shafts 90 and 91 which are extended longitudinally of the tank and are supported in suitable brackets 86 and 92. Sprockets 93 and 94 are mounted on said shafts and carry chain 95. Power for rotating said shafts may be applied to belt pulley 96 from any convenient source of power.

Each basket is provided with a yoke 97 to which a strap 98 is pivoted as by pivot 99. An eccentric 100 is carried on shafts 90 and 91 in operative relationship with each strap 98. The various eccentrics are preferably offset on shafts 90 and 91, so that the various baskets are lifted out of contact with the liquid in the tank at different times.

In this modification the clarifier tank is operated in the manner previously pointed out and the various baskets 72 are selectively and progressively raised out of contact with the liquid in the tank for cleaning purposes. It is obvious that any desired relationship may be maintained between the various eccentrics, although it is preferable to arrange them in manner specified so that only one basket is lifted out of the tank at any particular time.

This permits the remaining baskets to be maintained in operation whereby the capacity of the clarifier tank remains substantially unchanged and the operation thereof may be practically continuous.

The above described apparatus provides an automatic means for intermittently cleaning the clarifier medium without interrupting the operation of the system. This is particularly important in assuring a uniform operation of the clarifier medium in the different baskets and preventing certain of them from becoming clogged and thereby impeding the flow of liquid therethrough. It is evident that after the rate of flow of the liquid has been adjusted and the speed of rotation of the automatic carriage has been regulated, the apparatus may be used continuously for indefinite periods of time without requiring manual attention.

It is to be noted that in the above described apparatus all bearings are mounted above the surface of the liquid in the clarifier tank whereby the construction thereof is simplified. Furthermore, the baskets are so mounted that the contacting members are entirely out of the liquid whereby inspection and adjustment is facilitated, and damage due to submersion is avoided. By so mounting the baskets that only parallel movement is possible they are maintained substantially horizontal and the liquid therein is prevented from spilling when they are elevated by the above described mechanism. The construction also provides for unobstructed central feed for the liquid so that the operation of the clarifier is not interfered with by the automatic elevating mechanism.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a clarifier tank, a plurality of clarifier baskets mounted therein in the path of the liquid flow, each basket having associated therewith a member carrying a horizontal flange having upturned ends to provide a cam surface and means associated with said tank and co-operating with said surface for selectively elevating said baskets out of said liquid flow.

2. In a clarifier tank, a plurality of clarifier baskets mounted therein in the path of the liquid flow, each basket having associated therewith a member carrying a horizontal flange having upturned ends to provide a cam surface, a carriage associated with said tank and movable with respect to said baskets, and means associated with said carriage and co-operating with said flanges for selectively elevating said baskets out of said liquid flow.

3. In a clarifier tank, a plurality of clarifier baskets mounted therein in the path of the liquid flow, each basket having associated therewith a member carrying a horizontal flange having upturned ends to provide a cam surface, a carriage associated with said tank and movable with respect to said baskets, and a roller carried by said carriage in a position to contact with said flanges for selectively elevating said baskets out of said liquid flow.

4. In combination with a clarifier tank, a track, means for mounting said track above said tank and a carriage movably mounted on said track, said carriage having supporting wheels resting on the top surface of the said track and the guiding wheels resting against the inner face thereof, clarifier baskets mounted within said tank and means associated with said carriage for progressively elevating said baskets from their normal operating position.

5. In a clarifier tank, a track supported thereby, a plurality of clarifier baskets pivotally mounted in said tank in the path of the liquid flow, each basket carrying a horizontal flange, and a carriage movably mounted on said track and carrying a member adapted to contact with said flanges for selectively elevating said baskets out of said liquid flow.

6. In a substantially cylindrical clarifier tank, a cylindrical baffle mounted therein, a track supported by said tank and carrying a movable carriage, a truss supported by said baffle and driving means mounted on said truss and co-operating with said carriage, clarifier baskets mounted within said tank and means associated with said carriage for progressively elevating said baskets from their normal operating position.

7. In combination with a cylindrical clarifier tank, a circular track mounted thereon, a carriage supported on said track, a feed pipe mounted on said carriage, driving means for causing rotary movement of said carriage, a plurality of clarifier baskets pivotally carried in said tank in the path of the liquid flow and means associated with said carriage for selectively elevating said baskets.

8. In combination with a clarifier tank, a clarifier basket mounted therein for vertical movement, an upwardly extending member secured thereto, said member carrying a substantially horizontal flange, having its ends upturned to provide cam surfaces adapted to contact with a supporting member for elevating said basket.

9. In combination with a clarifier tank, a clarifier basket mounted therein for vertical movement, an upwardly extending member secured thereto, said member carrying a substantially horizontal flange, having its ends upturned to provide cam surfaces adapted to contact with a supporting member for elevating said basket, and means for supporting said basket from a stationary member comprising links pivoted to said upstanding member.

10. In a clarifier tank, a plurality of clarifier baskets, each basket having an upstanding member provided with a horizontal flange and a member carried by said tank and movable relative to said baskets for co-operating with said flanges and selectively elevating said baskets out of said liquid flow for cleaning purposes.

11. In a clarifier tank, a plurality of clarifier baskets mounted at spaced points in the path of the liquid flow, means for substantially preventing horizontal movement of said baskets while permitting vertical movement thereof and means for successively elevating said baskets out of the path of the liquid flow for cleaning purposes.

12. In a clarifier tank, means for obtaining a vertical liquid flow, a plurality of clarifier baskets mounted horizontally in the path of said liquid flow, means for substantially preventing horizontal movement of said baskets while permitting elevational movement thereof and means for successively elevating said baskets out of the path of said liquid flow for cleaning purposes.

13. In a clarifier tank, means for obtaining a vertical liquid flow, a plurality of clarifier baskets mounted horizontally in the path of said liquid flow, means for substantially preventing horizontal movement of said baskets while permitting elevational movement thereof, means for successively elevating said baskets out of the path of said liquid flow for cleaning purposes, said elevating means being adapted to maintain said baskets in a substantially horizontal position.

14. In a clarifier tank, a plurality of clarifier baskets, supporting means comprising parallel links interconnecting said baskets and said tank, said links being adapted to permit vertical movement of said baskets while maintaining said baskets in a substantially horizontal position and being adapted to prevent substantial horizontal movement of said baskets, and means associated with said tank for progressively elevating said baskets out of the path of the liquid flow for cleaning purposes.

15. In a clarifier tank, a plurality of clarifier baskets mounted therein at spaced points in the path of the liquid flow, each of said baskets having horizontal cam surfaces, means carried by said tank and progressively engaging the cam surfaces of said baskets for elevating said baskets out of the path of the liquid flow for cleaning purposes, and means for preventing substantial horizontal movement of said baskets.

16. In a clarifier tank, a plurality of clarifier baskets mounted therein at spaced points into the path of the liquid flow, each of said baskets having horizontal cam surfaces, a movable carriage mounted on said tank and having means associated therewith for co-operating with said cam surfaces and progressively elevating said baskets out of the path of the liquid flow and means associated with said baskets for substantially preventing horizontal movement thereof.

In testimony whereof I have hereunto set my hand.

WILLIAM C. LAUGHLIN.